United States Patent
Sandoval et al.

(10) Patent No.: US 9,667,603 B2
(45) Date of Patent: May 30, 2017

(54) METHODS AND SYSTEMS FOR FILTERING ENCRYPTED TRAFFIC

(71) Applicant: Symantec Corporation, Mountain View, CA (US)

(72) Inventors: Andrew L. Sandoval, Leander, TX (US); Shrikrishna Karandikar, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/072,589

(22) Filed: Mar. 17, 2016

(65) Prior Publication Data
US 2016/0248737 A1  Aug. 25, 2016

Related U.S. Application Data

(63) Continuation of application No. 11/971,645, filed on Jan. 9, 2008, now Pat. No. 9,304,832.

(51) Int. Cl.
*G06F 3/00* (2006.01)
*H04L 29/06* (2006.01)
*G06F 9/54* (2006.01)
*H04L 29/08* (2006.01)

(52) U.S. Cl.
CPC ............ *H04L 63/0428* (2013.01); *G06F 9/54* (2013.01); *H04L 63/1416* (2013.01); *H04L 67/02* (2013.01); *G06F 2209/542* (2013.01); *H04L 63/166* (2013.01)

(58) Field of Classification Search
CPC ....................................................... G06F 9/54
USPC ......................................................... 719/328
See application file for complete search history.

(56) References Cited

U.S. PATENT DOCUMENTS

| | | | | |
|---|---|---|---|---|
| 5,974,549 A | * | 10/1999 | Golan | G06F 9/468 714/47.3 |
| 7,308,648 B1 | * | 12/2007 | Buchthal | G06F 17/30896 704/10 |
| 2003/0105966 A1 | * | 6/2003 | Pu | G06F 21/31 713/186 |
| 2007/0143603 A1 | * | 6/2007 | Hadden | G06F 21/608 713/167 |
| 2008/0301051 A1 | * | 12/2008 | Stahlberg | G06Q 20/40 705/44 |

OTHER PUBLICATIONS

HT, How to configure a client to connect to an LDAP server using SSL, Dec. 19, 2005.*
Muhammad, Anti-Hook Shield against the Software Key Loggers, 2004.*

* cited by examiner

*Primary Examiner* — Lechi Truong
(74) *Attorney, Agent, or Firm* — Holland & Hart LLP

(57) ABSTRACT

Application programming interface (API) hooks are injected into an application program executing at a client during run-time. Responsive to these hooks, data intended for encryption prior to transmission from the client is diverted, for example for content filtering, compression, etc., prior to being encrypted. In the case of encrypted data received at the client, the data is decrypted but before being passed to the application it is diverted, under control of the API hooks, for content filtering, decompression, etc.

13 Claims, 2 Drawing Sheets

METHODS AND SYSTEMS FOR FILTERING ENCRYPTED TRAFFIC

CLAIM FOR PRIORITY

This application is a Continuation Application of U.S. patent application Ser. No. 11/971,645 filed Jan. 9, 2008, and entitled "METHODS AND SYSTEMS FOR FILTERING ENCRYPTED TRAFFIC," the contents of which are hereby incorporated by reference.

FIELD OF THE INVENTION

The present invention relates to methods and systems for filtering encrypted communication traffic, for example HTTPS traffic, without cracking the encryption and exposing the underlying plain text.

BACKGROUND

The Internet and its graphical user interface, the World Wide Web, are indispensable tools for all manner of communications and commerce. However, not all types of communications are appropriate for viewing by all people. Further, when transacting commerce via the Internet individuals generally insist upon some security measures to protect their sensitive information against compromise.

To address concerns regarding accessing of potentially inappropriate communications (and here Web sites and the like are considered to be a form of such communications), filtering technologies have been developed. These filters are software tools that can block access to specific Web sites and Internet services. Hence, the filters allow administrators or parents to selectively control what sort of communications can be accessed when employees or minors are "surfing" the Web using a personal computer and a Web browser. In some cases the filters are applied at the local computer level, while in other cases the filters are employed at computer systems (e.g., proxies) that act as gatekeepers between a personal computer or workstation and the Internet.

Security concerns, on the other hand, have been addressed through the use of encrypted communications between users' local computer systems and remote computer systems (called servers). Through an exchange of credentials that allow the local computer to verify the identity of the server (and, in some cases, vice-versa), the two computer systems establish an encrypted communication session with one another. Data (such as credit card numbers and the like) exchanged between the computer systems during this session is not visible to other computer systems (such as proxies) that may reside in the communication path between the user's local computer and the server. This affords the user some degree of privacy and security when conducting commerce or other, private transactions over the Internet.

While the use of encrypted communications is of great benefit in helping to facilitate commerce over the Internet, it does pose a problem for the filters discussed above. Because the data (called the plain text) is encrypted by the time it reaches the filters (whether the filters are deployed at the user's local computer or a proxy), the filters cannot determine whether or not the content represented by that data is subject to filtering under the rules prescribed by the filter administrator. Hence, the filter is rendered ineffective.

Recognizing this problem, proxy vendors have developed solutions that allow the encrypted communications to be "cracked" so that, for example, the underlying plain text from a server can be examined against the prescribed filing rules. If the content represented by this data is found to be inappropriate under the filtering rules, it is blocked. Otherwise, the data is re-encrypted and delivered to the user's local computer.

While this scheme allows content filters to operate on encrypted traffic exchanged between user's local computers and servers, it does compromise the very security which the encrypted communication scheme sought to establish in the first place. For example, if one considers an on-line banking transaction, which ordinarily would employ encrypted communications between the user's computer and the bank's server, by cracking the encrypted communications at a proxy disposed between these two systems the user's personal financial information and perhaps his/her log-in credentials for the bank's Web site become exposed and may be subject to compromise.

Perhaps an even more important limitation of this "proxy-in-the-middle" method is that it requires the client to trust everything that the proxy trusts. All secure communications are intercepted and the proxy acts as a "man-in-the-middle" replacing the server's certificate with its own, knowing the client will always trust the proxy even though the client may not always trust the endpoint to which the proxy is connected. That is, the endpoint's (e.g., a origin server's) certificate is never examined by the end user as it otherwise would be when a direct connection is made to the endpoint. Thus, this form of filtering for what are supposed to be secure communications is simply not acceptable to many individuals or institutions.

Nevertheless, simply because communications are encrypted is not a sufficient reason to allow the data associated with such communications to pass unfiltered. Malicious programs, such as worms and viruses could be disguised in such communications and, if not subject to filtering, would be allowed to pass unwittingly to a user's computer system or a server. Likewise, content deemed inappropriate by a network administrator or a parent could bypass filtering by being shrouded in an envelope of encryption. Hence, a methodology for filtering secure communications which nevertheless preserves the privacy of the information being exchanged and which ensures the user receives the original endpoint certificate is needed.

SUMMARY OF THE INVENTION

In various embodiments of the invention, application programming interface (API) hooks are injected into an application program executing at a client during run-time. Responsive to these hooks, data intended for encryption prior to transmission from the client is diverted, for example for content filtering, compression, etc., prior to being encrypted. In some cases, the API hooks may be included in computer-readable instructions that are injected into a currently running (or starting) process. These instructions contain the API hooks through which data flows for transmission just prior to encryption. This manipulation may or may not occur at the client and following the manipulations the data may be passed for encryption by an encryption engine at the client or remote from the client on which the application is executing (e.g., via a secure tunnel).

In the case of encrypted data received at the client, the data is decrypted but before being passed to the application it is diverted, under control of the API hooks, for content filtering, decompression, etc. Thereafter, assuming the data is not otherwise blocked, it is passed to the application.

These and further embodiments of the present invention are discussed below.

BRIEF DESCRIPTION OF THE DRAWINGS

The present invention is illustrated by way of example, and not limitation, in the figures of the accompanying drawings in which.

DETAILED DESCRIPTION

Figure 1:
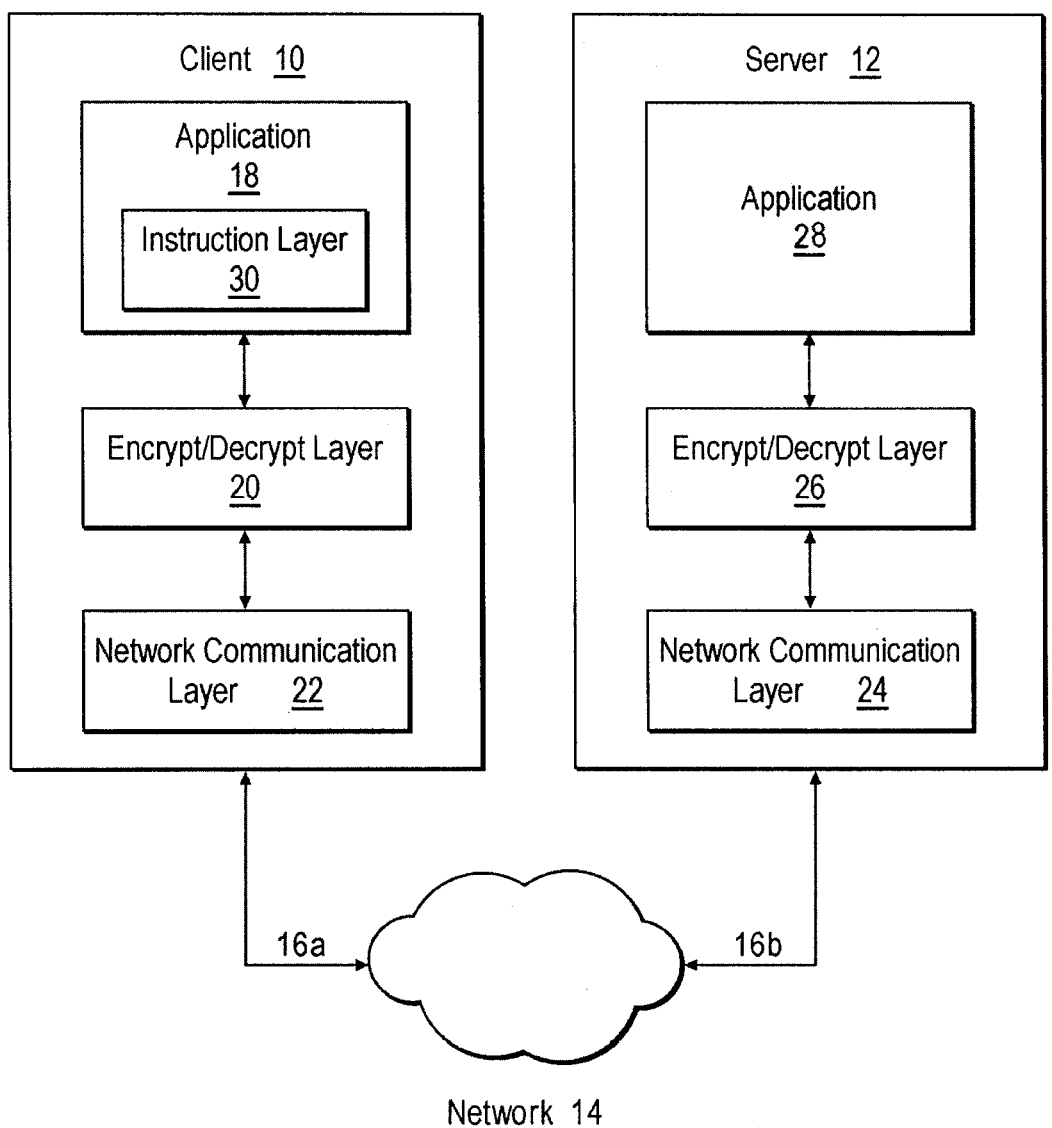
FIG. 1 illustrates a computer system employing API hooks injected into an application for diverting data prior to encryption or following decryption, in accordance with an embodiment of the present invention.

Described herein are methods and systems for filtering encrypted communication traffic, for example HTTPS traffic, without cracking the encryption and exposing the underlying plain text.

Readers should recognize that various embodiments of the present invention may be implemented with the aid of computer-implemented processes or methods (a.k.a. software, programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, terms such as software, programs, routines, scripts and the like, as used herein, are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. However, some embodiments of the invention are intended for network systems where encryption/decryption points can be identified and hooked. Further, although specific examples of hook points for SSL communications are discussed below, the techniques described herein are not necessarily limited to SSL and the same methods may find application anywhere that hooks may be set prior to encryption and after decryption of the data (i.e., prior to transmission or after receipt of such data, respectively).

Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with any computer system configuration, including personal computers, workstations, hand-held devices, multiprocessor systems, microprocessor-based, digital signal processor-based or other programmable consumer electronics, network computers that employ thin client architectures, minicomputers, mainframe computers, and the like. The invention can also be practiced in distributed computing environments where tasks are performed by remote processing devices that are linked through a communications network.

Referring now to FIG. 1, the illustration shows a computer system, called a client, 10 communicatively coupled to a server 12 via a computer network (or network of networks, such as the Internet) 14. Communications between the client 10 and the network 14 take place over communication link 16a, while communications between server 12 and network 14 take place over communications link 16b. Communications links 16a and 16b may be any form of communications links and the precise nature of these links is not critical to the present invention. Likewise, client 10 may be any of the above-described forms of computer systems. Often, client 10 will be a personal computer or a mobile device (such as a mobile phone) having one or more applications 18 capable of communicating over the Internet installed thereon. Such applications include, but are not limited to, Web browsers.

In order to provide secure communications of the type described above, client 10 also has installed thereon computer-readable instructions that provide an encryption layer 20. For secure communications between client 10 and server 12, plain text is passed from application 10 to encryption/decryption layer 20, where it is encrypted according to whichever secure communication scheme the client 10 and the server 12 have agreed upon. Often, especially for communications over the Internet, this secure communication scheme will be a form of secure socket layer (SSL) encryption, such as HTTPS (HTTP over SSL).

HTTP is the HyperText Transport Protocol and is one of the most often used communication protocols for passing data between computer systems via the Internet. HTTP is commonly used by Web browsers running on client computers to allow for the quick viewing of many filetypes and for ease of navigation among them. HTTPS operates virtually identically to HTTP, except that data transported over HTTPS is encrypted prior to transmission. The encryption is performed using cryptographic keys exchanged between the client and the server at the outset of a communications session. Because the keys are unique to each computer system, only the client and the server engaged in the communication session can decrypt one another's transmissions to recover the plain text.

As indicated then, plain text is passed from application program 18 at client 10 to encryption/decryption layer 20, where it is encrypted prior to transmission. Note, in some cases, the encryption may occur remote from the client, for example where the data is passed over a secure tunnel to be encrypted. In such instances, the encrypted data would be subsequently transferred to the receiver from the platform at which it was encrypted, or perhaps transferred back to the client for further processing and/or transmission to the receiver.

Assuming the encryption occurs at the client, the encrypted data is then passed to a network communications layer 22, which handles the actual transmission of this information over communication link 16*a*, network 14 and communication link 16*b* to the server 12. In the case of communications over the Internet, network communications layer 22, and a corresponding network communications layer 24 at server 12, communicate using the Transmission Control Protocol/Internet Protocol (TCP/IP) communication suite. The details of this communication protocol are not critical to the present invention and other forms of network layer communications and communications protocols may be used.

When the traffic is received at server 12, network communication layer 22 passes the encrypted data to encryption/decryption layer 24, where the original plain text is recovered. That is, using the cryptographic keys received from the client 10, encryption/decryption layer 26 decrypts the received data to recover the original plain text that was transmitted from application 18. This, plain text is then passed to application 28, where it is processed according to the nature of the application.

Communications from server 12 to client 10 happen in the reverse sequence, with encryption/decryption layer 26 encrypting plain text received from application 28 and passing the encrypted data to network communication layer 24, which transmits the encrypted information over network 14 to network communications layer 22 at client 10. The encrypted information is then passed to encryption/decryption layer 20, where it is decrypted using the keys provided by server 12. the resulting plain text is then passed to application 18. In the case where application 18 is a Web browser, this plain text may be a Web page or other information that is then presented to the user.

In accordance with the present invention, rather than employing a proxy or other computer system between client 10 and server 12 where the encrypted traffic passed between them is cracked, examined for compliance with filtering rules, and then either blocked or re-encrypted and passed on, computer software installed on client 10 is used to inject hooks into application 18 to allow for diversion of the plain text to instruction layer 30 for filtering and/or modification of the traffic prior to encryption. These hooks may be injected at any point during run-time, including but not limited to times when application 18 is initially launched at client 18.

In one embodiment of the present invention, where application 18 is a browser application, the hooks are placed in application programming interface (API) calls in the browser at the point where plain text is to be passed to encryption layer 20. Note, in many instances application layer 20 will actually be a component of application 18, but it is shown separately in the illustration for sake of clarity. By providing the hooks at this juncture, the plain text can be diverted to instruction layer 30 prior to encryption. This allows the plain text to be examined against filtering rules, compressed and/or otherwise modified prior to being encrypted. For example, in some cases it may be desirable to employ dictionary compression of the plain text prior to encryption. The present invention facilitates such operations by diverting the plain text, allowing the dictionary compression to be performed, and then passing the compressed version of the plain text to the encryption/decryption layer 20. From that point, the compressed data may be encrypted and passed to the server 12 as described above. Of course, a decompression process would need to be employed at the server once the encrypted traffic had been decrypted by encryption/decryption layer 24 before the decrypted, decompressed plain text could be passed to application 26.

Of course, in many instances instruction layer 30 will include a content filtering application or will permit the plain text to be diverted to such a content filtering application prior to encryption. This has the advantage of allowing the filtering desired by the administrator of the client (e.g., a parent), or the network in which the client is used, to be performed before the data ever leaves the client 10. In particular, the diversion may occur inside of application 18. The plain text thus remains within its place of origin and, as long as the instruction layer 30 is trusted, there will be no comprise of the data. Note that if the data left application 18 or client 10 for processing (in plain text), it would be subject to ever increasing risks of compromise.

Notwithstanding the increased risk of compromise, in some cases the plain text may be diverted to a remote, trusted computer system across a trusted communication link for the filtering to be performed. This would, in some instances, require the use of security systems at each end of the communication link with the remote system in order to be certain that the plain text had not been compromised.

In the reverse data path, for encrypted traffic received from server 12, that traffic is decrypted at encryption/decryption layer 20 as discussed above, but before being passed to the application 18 it is diverted by instruction layer 30 for filtering or other operations. In the case of filtering, the filter rules may be run against the now decrypted plain text to ensure compliance with the administrator's policies but because the plain text is now resident at client 10 it is not subject to compromise at some intermediary proxy. Again, the decrypted plain, text could be transferred from client 10 to a remote, trusted computer system across a trusted communication link for filtering. If the plain text passes the filtering operation it is provided to application 18, otherwise it is blocked. As indicated above, remote trusted systems and/or trusted external processes on the client system could be used in both pre-encrypt and post-decrypt situations.

In addition to or in place of the filtering, other operations may be employed on the decrypted plain text. For example, in the case of an acceleration application the decrypted data may be decompressed before being provided to application 18. Many other operations on or modifications to the data could be made in this fashion.

Thus, by employing instruction layer 30 at client 10, the present invention is able to facilitate filtering of or other operation on encrypted traffic, without actually having to crack the encryption. In essence, the data is acted upon either prior to the encryption or subsequent to the decryption, but always within a trusted environment so that it is not subject to compromise. This permits HTTPS filtering and/or HTTPS acceleration, etc., without the necessity of cracking open SSL connections and without port-specification. Although not discussed in detail above, SSL cracking is extremely difficult without targeting a specific port since the SSL protocol does not use any type of plain-text eye-catcher, etc. and multiple sends and receives are needed to detect the protocol. Moreover, without the need for an intervening proxy, certificate changes are not required and a client system can validate the original server certificates. This approach also minimizes the number of times data is encrypted and decrypted and provides opportunities to filter returned HTTPS content (e.g., keywords could be detected and used in page-ranking, etc.).

Various embodiments of the present invention may employ the hook points identified in Table 1 for commonly used browser applications such as Microsoft's Internet Explorer™, Mozilla's Firefox™, AOL's Netscape Navigator™, and Apple's Safari™. The hook points are listed as ModuleName!FunctionName. For example, wininet!InternetOpen is a hook on the function/API InternetOpen in the wininet.dll operating system component. Likewise, nspr4!PR_Connect is a hook on the PR_Connect function in the nspr4.dll or nspr4.so (etc., platform specific) application module.

TABLE 1

Hook Points for Commonly Used Browsers

| Hook Point | Purpose | Application(s) |
|---|---|---|
| wininet!InternetOpen | Catch HTTP connection | Internet Explorer & mshtml based applications |
| wininet!InternetOpenURL | Catch HTTP connection | Internet Explorer & mshtml based applications |
| wininet!HttpOpenRequest/Ex | Catch HTTP connection | Internet Explorer & mshtml based applications |
| wininet!InternetReadFile | Catch post-decryption reads | Internet Explorer & mshtml based applications |
| wininet!InternetWriteFile | Catch pre-encryption writes | Internet Explorer & mshtml based applications |
| nspr4!PR_Connect | Catch connection socket | Firefox, Navigator, and other NSPR4 based applications |
| ssl3!SSL_ImportFD | Catch SSL socket | Firefox, Navigator, and other NSPR4 based applications (independent of platform) |
| nspr4!Write | Catch pre-encryption writes | Firefox, Navigator, and other NSPR4 based applications (independent of platform) |
| nspr4!Read | Catch post-decryption reads | Firefox, Navigator, and other NSPR4 based applications (independent of platform) |
| CFNetwork!CFHTTPMessageCreateRequest | Catch HTTPS connection | Safari (Windows and Mac) and other standard API Mac applications |
| CoreFoundation!CFReadStreamRead | Catch post-decryption reads | Safari (Windows and Mac) and other standard API Mac applications |
| CoreFoundation!CFWriteStreamWrite | Catch pre-encryptibn writes | Safari (Windows and Mac) and other standard API Mac applications |

Depending on the application, hook points in addition to or other than those listed above may be desirable. For example, for basic filtering applications and for Internet Explorer running on Windows one may use hook points at:
wininet!InternetConnectA
wininet!HttpOpenRequestA; and
wininet!InternetCloseHandle.
For acceleration or more advanced filtering applications, hook points at the following may also be required:
wininet!InternetReadFile
wininet!InternetWriteFile
Likewise, for basic filtering applications and for Netscape/Firefox/Mozilla running on Windows one may use hook points at:
nspr4!PR_Connect
nspr4!PR_Close
ssl3!SSL_ImportFD
nspr4!PR_Write
nspr4!PR_Read
nsp4!PR_Shutdown; and
nspr4!PR_GetHostByName.
Other hook points may be needed for applications beyond basic filtering.

In the above lists, the PR_Close and InternetCloseHandle calls are hooked so that the end of a connection can be observed. The same is true with PR_Shutdown. The PR_GetHostByName is used to obtain the name (instead of the IP address) of the destination server. ssl3!SSL_ImportFD is used to replace a normal connection "handle" with an SSL connection handle. The hooks on the PR_Read, PR_Write, InternetReadFile, and InternetWriteFile calls are used to observe the data prior to encryption and after decryption. This way, data enters a "write" call in plain-text and leaves encrypted. Likewise, decrypted data is returned to an application when a "read" call returns. In the latter case the original "read" function is first called and the data then examined and/or modified before being passed to the application.

The above-described hooks may be implemented using any of a variety of techniques. For example one can inject a new dynamic library into a process using techniques similar to the injector described in U.S. patent application Ser. No. 10/829,499, filed 22 Apr. 2004, assigned to the assignee of the present invention and incorporated herein by reference. Upon initialization, the injected code installs hooks for the API call.

In addition, API calls can be hooked by overwriting portions of the original computer-readable instructions that make up the application to point to a trampoline to the newly injected code, and another trampoline may be created to allow the replacement API (contained in the newly injected code) to call the original code. The new API is responsible for returning control to the caller. In some instances, the API hooks may operate such that the original routine is called first and subsequent processing occurs before the code returns to the caller of the API. That processing can include changing the data originally passed to the API. The trampoline code for calling the original API must relocate the original (now overwritten) instructions and safely branch back to the unaltered portion of the original code. Of course, other techniques for hooking calls exist for example techniques described in the above-cited U.S. patent application Ser. No. 10/829,499, and the precise means by which the call is hooked is not critical to the present invention and any desirable means of doing so may be used.

Figure 2:
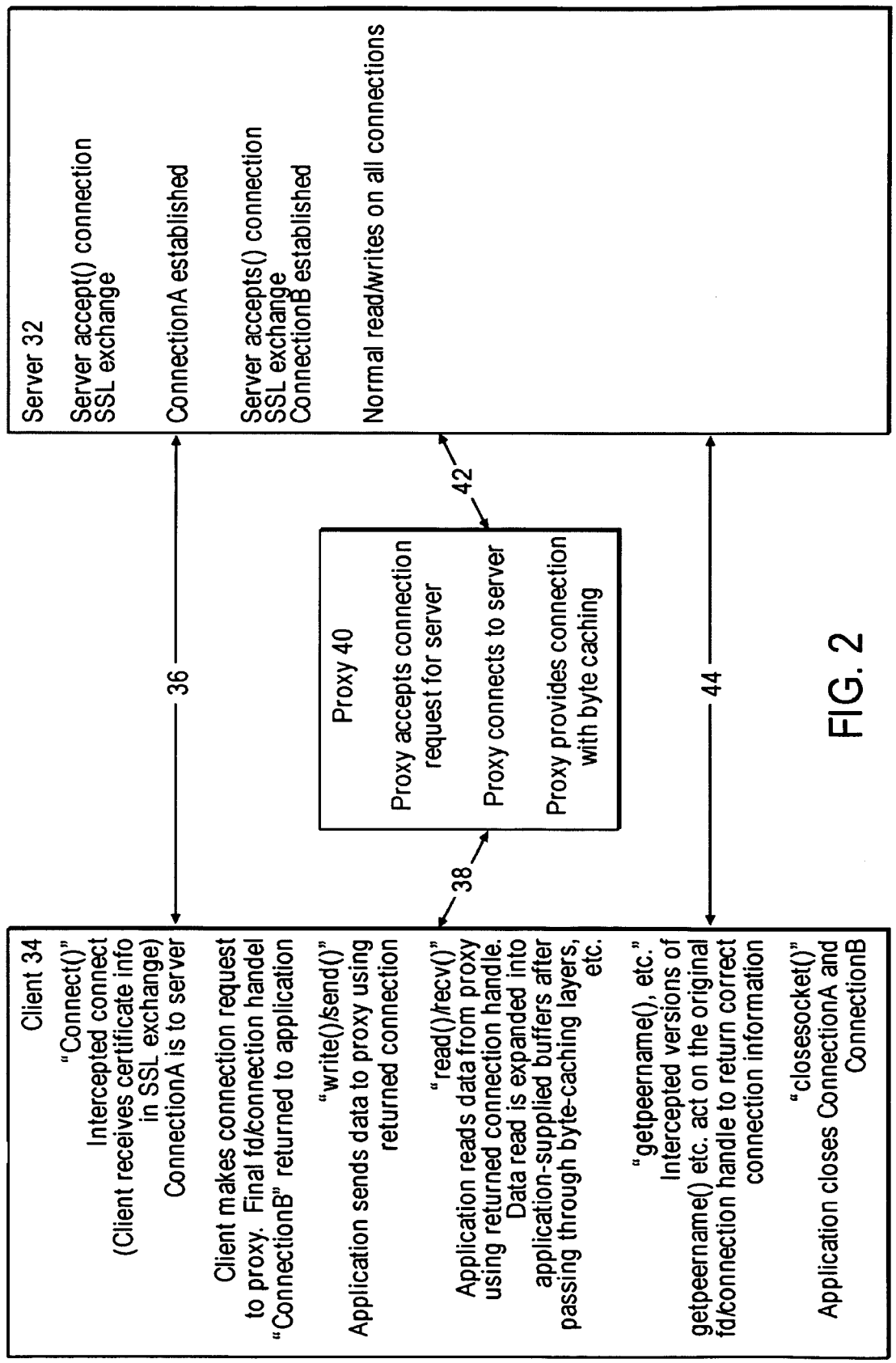
FIG. 2 illustrates a computer system in which a proxy participates in communications between a client and a server, but which allows for direct client-to-server encrypted communications in accordance with an embodiment of the present invention.

The present invention also facilitates the use of an intervening proxy for performing HTTPS acceleration without acting as a man-in-the-middle during certificate exchanges between the client and the server. As shown in FIG. 2, following a complete certificate exchange between a server 32 and a client 34 a first connection 36 (Connection A) is established between the client and the server. Thereafter, the client 34 opens a new connection 38 to a proxy 40, which then establishes its own connection 42 to the server 32. The client's connection 38 to the proxy 40 is returned to the application running on the client and is utilized in reads and writes, while the original connection 36 between client and server remains available for calls such as getpeername( ) 44. Client-side writes may be utilized in an acceleration engine as needed, and client-side reads may be expanded into buffers provided by the application. When the session is closed, the injected hooks close both the proxy connection 38 and the original server connection 36.

While the number of connections and SSL exchanges on the server is doubled over that which it would normally be when the above-described connection plan is used, it does permit genuine server verification for the client and the proxy and client are able to manage byte caching and other data manipulations without cracking open the SSL exchange and decrypting and re-encrypting traffic. Further optimizations to allow the original server connection to close immediately after the SSL handshake completes could be implemented in some instances. In such cases, the client would need to forward requests such as getpeername( ) to the proxy, which could then make the call using its own connection to the server.

There may be instances where the above-described scheme will not be appropriate, for example for servers that require client certificates for authenticating the client. If such servers also support so-called proxy certificates, as described in IETF RFC 3820, a variation of the above scheme is possible. Proxy certificates are certificates that a "middle man", such as a proxy, presents to one application end point (typically a server) on behalf of another application end point (e.g., a client). The proxy certificate is signed by the entity on whose behalf the proxy is acting. The two-connection scheme can make use of such proxy certificates in cases where client certificate authentication is deployed at the server.

In such scenarios, the client can issue a proxy certificate to the intervening proxy using its private key. The certificate request from proxy 40 to the client 34 and the return of the signed proxy certificate from the client 34 to the proxy 40 can happen on connection 38 between client 34 and proxy 40. The client 34 can also chain along its own certificate along with the signed proxy certificate. The proxy can then present the new certificate as it's "proxy certificate" along with the client's original certificate in a certificate chain to the server on connection 42. This should permit the server to verify the certificate chain comprising of proxy certificate followed by the client's certificate and complete an SSL handshake with the proxy and facilitate the above-described transactions. Note the that presence of the original client certificate in this certificate chain enables the server to identify the client end point and the intervening proxy.

Thus, methods and systems for filtering encrypted communication traffic, for example HTTPS traffic, without cracking the encryption and exposing the underlying plain text have been described. Although discussed above with reference to certain illustrated embodiments, the present invention should not be limited thereby. Instead, the invention should only be measured in terms of the claims, which follow.

What is claimed is:

1. A method, comprising:
   injecting, by a first device executing a software process, one or more programmatic hooks for application programming interface (API) calls into a web browser of a client device, comprising one of:
      overwriting one or more portions of code of a web browser application to point to a content filtering API, and
      overwriting a routine of the web browser application with the content filtering API;
   intercepting, by the one or more programmatic hooks, unencrypted data to be transmitted by the web browser to a remote device, prior to encryption by the web browser;
   forming a subset of the intercepted data by removing content from the intercepted data using the content filtering API configured to remove content from unencrypted data according to content filtering rules;
   providing, by the content filtering API, the subset of the unencrypted data to an encryption process of the web browser for encryption and transmittal to the remote device; and
   intercepting, by the one or more programmatic hooks, display data for display by the web browser application, wherein the display data was received and unencrypted by the first device prior to the one or more programmatic hooks intercepting the data for display, and wherein the one or more programmatic hooks intercept the display data prior to the web browser application displaying the data.

2. The method as in claim 1, wherein the content filtering API is configured to call the overwritten routine.

3. The method as in claim 1, wherein the one or more programmatic hooks reside in a wininet.dll dynamic link library.

4. The method as in claim 1, further comprising:
   forming a subset of the display data using the content filtering API; and
   providing the subset of the display data for display by the web browser application.

5. The method as in claim 1, wherein the one or more programmatic hooks reside in a nspr4.dll dynamic link library or a nspr4.so library.

6. A method, comprising:
   injecting, by a first device executing a software process, one or more programmatic hooks for application programming interface (API) calls into a web browser of a client device, comprising one of:

overwriting one or more portions of code of a web browser application to point to a content filtering API, and overwriting a routine of the web browser application with the content filtering API;

intercepting, by the one or more programmatic hooks, display data for display by the web browser application, wherein the display data was received and unencrypted by the first device prior to the one or more programmatic hooks intercepting the data for display, and wherein the one or more programmatic hooks intercept the display data prior to the web browser application displaying the data;

forming a subset of the display data using the content filtering API configured to remove content from the display data according to content filtering rules; and providing the subset of the display data for display by the web browser application.

7. The method as in claim 6, wherein the content filtering API is configured to call the overwritten routine.

8. The method as in claim 6, wherein the one or more programmatic hooks reside in a wininet.dll dynamic link library.

9. The method as in claim 6, wherein the one or more programmatic hooks reside in a nspr4.dll dynamic link library or nspr4.so library.

10. The method as in claim 6, further comprising:

intercepting, by the one or more programmatic hooks, unencrypted data to be transmitted by the web browser to a remote device, prior to encryption by the web browser;

forming a subset of the intercepted data by removing content from the intercepted data using the content filtering API; and providing, by the content filtering API, the subset of the unencrypted data to an encryption process of the web browser for encryption and transmittal to the remote device.

11. A non-transitory computer-readable medium comprising instructions that, when executed by a processor, cause the processor to:

inject one or more programmatic hooks for application programming interface (API) calls into a web browser of a client device, comprising one of:

overwriting one or more portions of code of a web browser application to point to a content filtering API, and overwriting a routine of the web browser application with the content filtering API;

intercept, by the one or more programmatic hooks, unencrypted data to be transmitted by the web browser to a remote device, prior to encryption by the web browser;

form a subset of the intercepted data by removing content from the intercepted data using the content filtering API configured to remove content from unencrypted data according to content filtering rules;

provide, by the content filtering API, the subset of the unencrypted data to an encryption process of the web browser for encryption and transmittal to the remote device; and intercept, by the one or more programmatic hooks, display data for display by the web browser application, wherein the display data was received and unencrypted by the first device prior to the one or more programmatic hooks intercepting the data for display, and wherein the one or more programmatic hooks intercept the display data prior to the web browser application displaying the data.

12. The computer-readable medium as in claim 11, wherein the content filtering API is configured to call the overwritten routine.

13. The computer-readable medium as in claim 11, wherein the instructions, when executed by the processor, cause the processor to:

form a subset of the display data using the content filtering API; and provide the subset of the display data for display by the web browser application.

\* \* \* \* \*